(12) United States Patent
Dogan et al.

(10) Patent No.: US 11,106,183 B1
(45) Date of Patent: Aug. 31, 2021

(54) ADAPTIVE ARCHITECTURE FOR CONTROLLING UNCERTAIN SYSTEMS WITH UNMODELED DYNAMICS

(71) Applicants: Kadriye Merve Dogan, Tampa, FL (US); Benjamin C. Gruenwald, Evansville, IN (US); Tansel Yucelen, Tampa, FL (US); Jonathan A. Muse, Beavercreek, OH (US)

(72) Inventors: Kadriye Merve Dogan, Tampa, FL (US); Benjamin C. Gruenwald, Evansville, IN (US); Tansel Yucelen, Tampa, FL (US); Jonathan A. Muse, Beavercreek, OH (US)

(73) Assignee: University of South Florida, Tampa, FL (US)

( * ) Notice: Subject to any disclaimer, the term of this patent is extended or adjusted under 35 U.S.C. 154(b) by 239 days.

(21) Appl. No.: 16/234,393

(22) Filed: Dec. 27, 2018

Related U.S. Application Data (60) Provisional application No. 62/610,580, filed on Dec. 27, 2017.

(51) Int. Cl.
*G05B 13/04* (2006.01)
*G06F 17/11* (2006.01)
(Continued)

(52) U.S. Cl.
CPC ............ *G05B 13/042* (2013.01); *B64D 45/00* (2013.01); *G06F 17/11* (2013.01); *G06F 17/16* (2013.01)

(58) Field of Classification Search
None
See application file for complete search history.

(56) References Cited

U.S. PATENT DOCUMENTS

| 8,996,195 | B2 * | 3/2015 | Yucelen | G05B 13/042 701/1 |
| 9,280,146 | B2 * | 3/2016 | Gahinet | G05B 13/021 |

(Continued)

OTHER PUBLICATIONS

Matsutani et al., "Trustable Autonomous Systems Using Adaptive Control", 50th IEEE Conference on Decision and Control and European Control Conference, Dec. 12-15, 2011, pp. 6760-6764. (Year: 2011).*

(Continued)

*Primary Examiner* — Todd Melton
(74) *Attorney, Agent, or Firm* — Thomas | Horstemeyer, LLP (57) ABSTRACT

Various examples are provided related to adaptive architectures for controlling uncertain system with unmodeled dynamics. A closed-loop dynamical system subject to an adaptive controller can remain stable if there does not exist significant unmodeled dynamics or the effect of system uncertainties is negligible. In one example, a system includes a controller that can receive one or more input signals including control signals, sensor data associated with operation of the aircraft or aviation system, or a combination thereof; generate an system control signal utilizing a model reference adaptive control architecture comprising an adaptive robustifying term that maintains system stability within defined bounds; and provide the system control signal to an actuator or other system components to adjust operation of, e.g., an aircraft or aviation system.

13 Claims, 4 Drawing Sheets

(51) Int. Cl.
*G06F 17/16* (2006.01)
*B64D 45/00* (2006.01)

(56) References Cited

U.S. PATENT DOCUMENTS

| | | | | |
|---|---|---|---|---|
| 10,095,198 | B1* | 10/2018 | Ross | G05B 13/04 |
| 2008/0221710 | A1* | 9/2008 | Brunell | G05B 5/01 |
| | | | | 700/45 |
| 2016/0200420 | A1* | 7/2016 | Mckenna | B64C 13/16 |
| | | | | 244/215 |

OTHER PUBLICATIONS

Dogan et al., "On Model Reference Adaptive Control for Uncertain Dynamical Systems with Unmodeled Dynamics", IEEE 55th Conference on Decision and Control, Dec. 12-14, 2016, pp. 377-382. (Year: 2016).*

* cited by examiner

FIG. 4

ADAPTIVE ARCHITECTURE FOR CONTROLLING UNCERTAIN SYSTEMS WITH UNMODELED DYNAMICS

CROSS REFERENCE TO RELATED APPLICATIONS

This application claims priority to, and the benefit of, U.S. provisional application entitled "An Adaptive Architecture for Controlling Uncertain System with Unmodeled Dynamics" having Ser. No. 62/610,580, filed Dec. 27, 2017, which is hereby incorporated by reference in its entirety.

STATEMENT REGARDING FEDERALLY SPONSORED RESEARCH OR DEVELOPMENT

This invention was made with government support under FA8650-10-D-3037 awarded by the Air Force Research Lab. The Government has certain rights in the invention.

BACKGROUND

Adaptive control systems, which can be broadly classified as either direct or indirect, have the capability to guarantee system stabilization and a prescribed level of command following performance in the presence of system uncertainties that can result from idealized assumptions, linearization, model order reduction, exogenous disturbances, and degraded modes of operation. In particular, direct adaptive controllers adapt feedback gains in response to system variations to suppress the effect of system uncertainties without requiring a parameter estimation algorithm. This property distinguishes them from indirect adaptive controllers that employ an estimation algorithm to approximate unknown system parameters and adapt controller gains.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Disclosed herein are various examples related to adaptive architectures for controlling uncertain system with unmodeled dynamics. A closed-loop dynamical system subject to an adaptive controller can remain stable if there does not exist significant unmodeled dynamics or the effect of system uncertainties is negligible. This implies that these controllers cannot tolerate large system uncertainties even when the unmodeled dynamics satisfy a set of conditions. In this disclosure, an adaptive control architecture is presented such that the adaptive controller is augmented with an adaptive robustifying term. Unlike standard adaptive controllers, the disclosed architecture allows the closed-loop dynamical system to remain stable in the presence of large system uncertainties when the unmodeled system dynamics satisfy a set of conditions. A numerical example is provided to demonstrate the efficacy of the disclosed approach. Reference will now be made in detail to the description of the embodiments as illustrated in the drawings, wherein like reference numbers indicate like parts throughout the several views.

A challenge in the design of model reference adaptive control architectures is to achieve system stability in the presence of not only system uncertainties but also unmodeled dynamics. In particular, investigation of the stability of the closed-loop dynamical system subject to an adaptive controller and reveals that the presence of unmodeled dynamics can result in system instability. Based on this phenomenon, several approaches have been proposed. From an intelligent (e.g., neural networks-based or fuzzy logic-based) adaptive control perspective, unmodeled dynamics can be considered in their formulation to achieve robust stability. From a direct adaptive control perspective, approaches can be proposed toward robust model reference adaptive control designs. Although these approaches can achieve system stability in the presence of unmodeled dynamics with respect to a set of initial conditions or under the assumption of persistency of excitation, a projection operator-based approach can be utilized to show the stability without making assumptions on initial conditions and persistency of excitation—when a stability limit holds for model reference adaptive control systems.

From a practical standpoint, this stability limit implies that the closed-loop dynamical system subject to a model reference adaptive controller remains stable either if there does not exist significant unmodeled dynamics or the effect of system uncertainties is negligible. This means that these controllers cannot tolerate large system uncertainties even when unmodeled dynamics satisfy a set of conditions. Considering one of the main advantages of using adaptive controllers versus fixed-gain robust controllers, which has the capability of tolerating large system uncertainty levels (in the absence of unmodeled dynamics), this stability limit can be relaxed to allow model reference adaptive controllers to tolerate large system uncertainty levels even in the presence of unmodeled dynamics.

In this disclosure, a model reference adaptive control architecture is proposed for system stabilization and command following. Unlike standard adaptive controllers (see Theorem 1 and Corollary 1), the disclosed architecture allows the closed-loop dynamical system to remain stable in the presence of large system uncertainties when the unmodeled dynamics, which depend on the control signal and the system state vector, satisfy a relaxed stability limit. This is accomplished by adding an adaptive robustifying term to the control signal that augments a projection operator-based adaptive control approach. Specifically, without making assumptions on initial conditions and persistency of excitation, a stability condition (see Theorem 2) using Lyapunov stability is shown for uniform boundedness of the closed-loop dynamical system trajectories for all initial conditions. A theoretical interpretation of this condition (see Corollary 2) is presented, which gives the aforementioned relaxed stability limit. The efficacy of the proposed approach is further demonstrated through an illustrative numerical example on a coupled dynamical system.

This disclosure presents the standard model reference adaptive control problem formulation in the presence of unmodeled dynamics and shows a version of the stability limit revealed in "Trustable autonomous systems using adaptive control" by Matsutani et al. (*IEEE Conference on Decision and Control*, pp. 6760-6764, 2011), which is hereby incorporated by reference in its entirety, where this limit is relaxed with the proposed approach to the model reference adaptive control problem. An illustrative numerical example is provided.

Throughout this paper, $\mathbb{R}$ denotes the set of real numbers, $\mathbb{R}^n$ denotes the set of n×1 real column vectors, $\mathbb{R}^{n \times m}$ denotes the set of n×m real matrices, $\mathbb{R}_+$ (resp., $\overline{\mathbb{R}}_+$) denotes the set of positive (resp., nonnegative) real numbers, $\mathbb{R}_+^{n \times n}$ (resp., $\overline{\mathbb{R}}_+^{n \times n}$) denotes the set of n×n positive-definite (resp., nonnegative-definite) real matrices, $\mathbb{S}^{n \times n}$ denotes the set of n×n symmetric real matrices, $\mathbb{D}^{n \times n}$ denotes the set of n×n real matrices with diagonal scalar entries, and "$\triangleq$" de-notes the equality by definition. In addition, we use $(\bullet)^T$ for the transpose operator, $(\bullet)^{-1}$ for the inverse operator, tr($\bullet$) for the trace operator, $\overline{\lambda}(A)$ (resp., $\underline{\lambda}(A)$) for the maximum (resp., minimum) eigenvalue of the matrix $A \in \mathbb{R}^{n \times n}$, $\|\bullet\|_2$ for the Euclidean norm, and $\|A\|_2 \triangleq (\overline{\lambda}(A^T A))^{1/2}$ for the induced 2-norm of the matrix $A \in \mathbb{R}^{n \times m}$.

To begin, the standard model reference adaptive control problem formulation in the presence of unmodeled dynamics is presented and a version of the stability limit is revealed. Specifically, a definition of the projection operator is introduced.

Definition 1. Consider a convex hypercube in $\mathbb{R}^n$ given by $$\Omega = \{\theta \in \mathbb{R}^n : (\theta_i^{min} \leq \theta_i \leq \theta_i^{max})_{i=1,2,\ldots,n}\}, \quad (1)$$

where $\theta_i^{min}$ and $\theta_i^{max}$ respectively represent the minimum and maximum bounds for the $i^{th}$ component of the n-dimensional parameter vector $\theta$. For a sufficiently small positive constant $\epsilon$, another hypercube is given by $$\Omega_\epsilon = \{\theta \in \mathbb{R}^n : (\theta_i^{min} + \epsilon \leq \theta_i \leq \theta_i^{max} - \epsilon)_{i=1,2,\ldots,n}\}, \quad (2)$$

where $\Omega_\epsilon \subset \Omega$. Then, the projection operator Proj: $\mathbb{R}^n \times \mathbb{R}^n \to \mathbb{R}^n$ is defined by $$Proj(\theta, y) \triangleq \begin{cases} \left(\dfrac{\theta_i^{max} - \theta_i}{\epsilon}\right) y_i, & \text{if } \theta_i > \theta_i^{max} - \epsilon \text{ and } y_i > 0 \\ \left(\dfrac{\theta_i - \theta_i^{min}}{\epsilon}\right) y_i, & \text{if } \theta_i < \theta_i^{min} - \epsilon \text{ and } y_i < 0 \\ y_i, & \text{otherwise} \end{cases} \quad (3)$$

componentwise, where $y \in \mathbb{R}^n$.

It follows from the Definition 1 that $$(\theta - \theta^*)^T (Proj(\theta, y) - y) \leq 0, \ \theta^* \in \mathbb{R}^n, \quad (4)$$

holds. The definition of the projection operator can be generalized to matrices as $$Proj_m(\Theta, Y) = (Proj_m(col_1(\Theta), col_1(\Theta Y)), \ldots, Proj_m(col_m(\Theta), col_m(\Theta Y))),$$

where $\Theta \in \mathbb{R}^{n \times m}$, $Y \in \mathbb{R}^{n \times m}$ and $col_i(\bullet)$ denotes ith column operator. In this case, for a given $\Theta^* \in \mathbb{R}^{n \times m}$, it follows from eqn. (4) that $$tr[(\Theta - \Theta^*)^T (Proj_m(\Theta, Y) - Y)] = \quad (5)$$

$$\sum_{i=1}^m [col_i(\Theta - \Theta^*)^T (Proj(col_i(\Theta), col_i(Y)) - col_i(Y))] \leq 0.$$

Next, the problem formulation considered throughout this disclosure is introduced. Specifically, consider the uncertain dynamical system subject to a class of unmodeled system dynamics that depends on the control signal and the system state vector given by $$\dot{x}(t) = Ax(t) + B\Lambda u(t) + B\delta(x(t)) + Bp(t), \ x(0) = x_0, \quad (6)$$

$$\dot{q}(t) = Fq(t) + G_1 \Lambda u(t) + G_2 x(t), \ q(0) = q_0, \quad (7)$$

$$p(t) = Hq(t), \quad (8)$$

where $x(t) \in \mathbb{R}^n$ is the measurable state vector, $u(t) \in \mathbb{R}^m$ is the control input, $q(t) \in \mathbb{R}^p$ and $p(t) \in \mathbb{R}^m$ respectively are the unmodeled dynamics state and output vectors, $A \in \mathbb{R}^{n \times n}$ is a known system matrix, $B \in \mathbb{R}^{n \times m}$ is a known input matrix such that the pair (A, B) is controllable, $\Lambda \in \mathbb{R}_+^{m \times m} \cap \mathbb{D}^{m \times m}$ is unknown control effectiveness matrix $\delta: \mathbb{R}^n \to \mathbb{R}^m$, is a system uncertainty, and $F \in \mathbb{R}^{p \times p}$, $G_1 \in \mathbb{R}^{p \times m}$, $G_2 \in \mathbb{R}^{p \times n}$, and $H \in \mathbb{R}^{m \times p}$ are matrices associated with unmodeled dynamics such that F is Hurwitz. Note that since $\Lambda \in \mathbb{R}_+^{m \times m} \cap \mathbb{D}^{m \times m}$, it follows that there exists $\lambda_L \in \mathbb{R}_+$ and $\lambda_U \in \mathbb{R}_+$ such that $\lambda_L \leq \|\Lambda\|_2 \leq \lambda_U$ holds. In addition, note that since F is Hurwitz, there exists $S \in \mathbb{R}_+^{p \times p} \cap \mathbb{S}^{p \times p}$ such that $0 = F^T S + SF + I$.

Remark 1. Let $z(t) = \beta q(t)$, $z(t) \in \mathbb{R}^p$, where $\beta \in \mathbb{R}^+$ is a free variable to be used later in analysis of this disclosure. Then, the unmodeled dynamics given by eqns. (7) and (8) can equivalently be represented as $$\dot{z}(t) = Fz(t) + \beta G_1 \Lambda u(t) + \beta G_2 x(t), \ z(0) = \beta q_0, \quad (9)$$

$$p(t) = \beta^{-1} Hz(t). \quad (10)$$

Furthermore, using this state transformation, the uncertain dynamical system subject to the considered class of unmodeled system dynamics of eqns. (6), (7), and (8) can be equivalently written as $$\dot{x}(t) = Ax(t) + B\Lambda u(t) + B\delta(x(t)) + \beta^{-1} BHz(t), \ x(0) = x_0, \quad (11)$$

$$\dot{z}(t) = Fz(t) + \beta G_1 \Lambda u(t) + \beta G_2 x(t), \ z(0) = \beta q_0. \quad (12)$$

An overview of a standard adaptive control formulation can be presented and show a version of the stability limit revealed in "Trustable autonomous systems using adaptive control" by Matsutani et al. (*IEEE Conference on Decision and Control*, pp. 6760-6764, 2011). Begin with the following standard assumption on system uncertainty parameterization.

Assumption 1. The system uncertainty $\delta: \mathbb{R}^n \to \mathbb{R}^m$ can be parameterized as $$\delta(x) = W_0^T \sigma_0(x), \ x \in \mathbb{R}^n, \quad (13)$$

where $W \in \mathbb{R}^{s \times m}$ is an unknown weight matrix and $\sigma_0 \in \mathbb{R}^n \to \mathbb{R}^s$ is a known basis function of the form $\sigma_0(x) = [\sigma_{0_1}(x), \sigma_{0_2}(x), \ldots, \sigma_{0_s}(x)]^T$. In addition, the basis function satisfies the inequality $$\|\sigma_0(x(t))\|_2 \leq l_0 \|x(t)\|_2 + l_c, \ x(t) \in \mathbb{R}^n, \quad (14)$$

where $1_0 \in \mathbb{R}_+$ and $1_c \in \mathbb{R}_+$.

Now, consider the reference system, which captures a desired closed-loop dynamical system performance, given by $$\dot{x}_r(t) = A_r x_r(t) + B_r c(t), \quad x_r(0) = x_{r0}, \quad (15)$$

where $x_r(t) \in \mathbb{R}^n$ is the reference state vector, $c(t) \in \mathbb{R}^m$ is a given uniformly continuous bounded command, $A_r \in \mathbb{R}^{n \times n}$ is the Hurwitz reference system matrix, and $B_r \in \mathbb{R}^{n \times m}$ is the command input matrix. Since $A_r$ is Hurwitz, there exists $P \in \mathbb{R}_+^{n \times n} \cap \mathbb{S}^{n \times n}$ such that $0 = A_r^T P + PA_r + I$.

The next assumption is standard and known as matching condition in the adaptive control literature.

Assumption 2. There exist $K_1 \in \mathbb{R}^{m \times n}$ and $K_2 \in \mathbb{R}^{m \times m}$ such that $A_r \triangleq A - BK_1$ and $B_r \triangleq BK_2$. It now follows from Assumptions 1 and 2 that eqn. (11) can be rewritten as $$\dot{x}(t) = A_r x(t) + B_r c(t) + B\Lambda[u(t) + W^T \sigma(\cdot)] + \beta^{-1} BHz(t), \quad (16)$$

where $W \triangleq [\Lambda^{-1} W_0^T, \Lambda^{-1} K_1, -\Lambda^{-1} K_2]^T \in \mathbb{R}^{q \times m}$ and $\sigma(\cdot) \triangleq [\sigma_0^T(x(t)), x^T(t), c^T(t)]^T \in \mathbb{R}^q$ with $q \triangleq s + n + m$. In addition, letting $e(t) \triangleq x(t) - x_r(t)$ be the system error, the system error dynamics can be written using eqns. (15) and (16) as $$\dot{e}(t) = A_r e(t) + B\Lambda[u(t) + W^T \sigma(\cdot)] \beta^{-1} BHz(t), \quad e(0) = e_0. \quad (17)$$

Considering eqn. (17), let the adaptive control law be given by $$u(t) = -\hat{W}^T(t)\sigma(\cdot) \quad (18)$$

where the $\hat{W}(t) \in \mathbb{R}^{q \times m}$ is an estimate of the unknown weight $W$ satisfying the projection operator based weight update law $$\dot{\hat{W}}(t) = \gamma \text{Proj}_m \hat{W}(t), \sigma(\cdot) e^T(t) PB], \quad \hat{W}(0) = \hat{W}_0, \quad (19)$$

with $\gamma \in \mathbb{R}_+$ being the learning rate. Note that since a projection bound in eqn. (19) is utilized, it follows that $\|\hat{W}(t)\|_2 \leq w^*$, $w^* \in \mathbb{R}_+$. Now, using eqn. (18) respectively in eqns. (17) and (12), one can write $$\dot{e}(t) = A_r e(t) - B\Lambda \tilde{W}^T(t)\sigma(\cdot) + \beta^{-1} BHz(t), \quad e(0) = e0, \quad (20)$$

where $\tilde{W} \triangleq \hat{W}(t) - W \in \mathbb{R}^{q \times m}$. The next theorem is on the stability of the closed-loop dynamical system subject to a standard, projection operator-based adaptive controller.

Theorem 1. Consider the uncertain dynamical system subject to control signal and system state dependent unmodeled dynamics given by eqns. (11) and (12), the reference system given by eqn. (15), the adaptive control law given by eqns. (18) and (19), and assume that Assumptions 1 and 2, and the following condition $$\mathcal{R} \triangleq \begin{bmatrix} 1 & \eta \\ \eta & \alpha \end{bmatrix} > 0 \quad (22)$$

hold, where $\alpha \in \mathbb{R}_+$, $\eta \triangleq -\beta^{-1} \|PB\|_2 \|H\|_2 - \alpha\beta\lambda_U w^* l \|SG_1\|_2 - \alpha\beta\mu SG_2\|_2$, and $1 \triangleq (1 + 1_0)$. Then, the solution $(e(t), z(t), \tilde{W}(t))$ of the closed-loop dynamical system is uniformly bounded for all initial conditions.

Proof. To show uniform boundedness of the solution $(e(t), z(t), \tilde{W}(t))$ for all initial conditions, consider the Lyapunov-like function given by $$\mathcal{V}(e, \tilde{W}, z) = e^T Pe + \gamma^{-1} tr(\tilde{W} \Lambda^{1/2})^T (\tilde{W} \Lambda^{1/2}) + \alpha z^T Sz. \quad (23)$$

Note that $\mathcal{V}(0,0,0) = 0$ and $\mathcal{V}(e, z, \tilde{W}) > 0$ for all $(e, z, \tilde{W}) \neq (0, 0, 0)$. Differentiating eqn. (23) along the closed-loop dynamical system trajectories yields $$\dot{\mathcal{V}}(e(t), \tilde{W}(t), z(t)) \leq -\|e(t)\|_2^2 - \alpha \|z(t)\|_2^2 + 2\beta^{-1} \|e(t)\|_2 \|PB\|_2 \|H_2\| \|z(t)\|_2$$

$$+ 2\alpha\beta \|z(t)\|_2 \|SG_1\|_2 \|\Lambda\|_2 \|\hat{W}(t)\|_2 \|\sigma(\cdot)\|_2$$

$$+ 2\alpha\beta \|z(t)\|_2 \|SG_1\|_2 \|x(t)\|_2. \quad (24)$$

Next, an upper bound for $\|\sigma(\cdot)\|_2$ can be given using Assumption 1 as $$\|\sigma(\cdot)\|_2 \leq l \|e(t)\|_2 + d^*, \quad (25)$$

where $d^* \in \mathbb{R}_+$ is an upper bound for $l \|x_r(t)\|_2 + \|c(t)\|_2 + 1_c$; that is, $l \|x_r(t)\|_2 + \|c(t)\|_2 + 1_c \leq d^*$, since $x_5(t)$ and $c(t)$ are both bounded by their definitions. Then, an upper bound for $\|x(t)\|_2$ can be given $\|x(t)\|_2 \leq \|e(t)\|_2 + \|x_r(t)\|_2$. Now, it follows from eqns. (24) and (25) that $$\dot{\mathcal{V}}(e(t), \tilde{W}(t), z(t)) \leq -\xi^T(t) R \xi(t) + 2\alpha\beta \|z(t)\|_2 \|SG_1\|_2 \lambda_U w^* d^*$$

$$+ 2\alpha\beta \|z(t)\|_2 \|SG_1\|_2 \|x_r(t)\|_2, \quad (26)$$

where $\xi(t) \triangleq [\|e(t)\|_2, \|z(t)\|_2]^T$. Finally, eqn. (26) can be rewritten as $$\dot{\mathcal{V}}(e(t), \tilde{W}(t), z(t)) \leq -\lambda(\mathcal{R}) \|\xi(t)\|_2 \left[ \|\xi(t)\|_2 - \frac{r_0}{\lambda(\mathcal{R})} \right], \quad (27)$$

where $r_0 \triangleq 2\alpha\beta \|SG_1\|_2 \lambda_U w^* d + 2\alpha\beta \|SG_2\|_2 x^*_r$, $\|x_r(t)\|_2 \leq x^*_r$, and hence, there exists a compact set such that $\dot{\mathcal{V}}(e(t), z(t), \tilde{W}(t)) < 0$ outside of this set, which proves uniform boundedness of solution $(e(t), z(t), \tilde{W}(t))$ for all initial conditions.

Note that the condition given by eqn. (22) imposes a stability limit for standard adaptive control systems and a version of this stability limit is highlighted in "Trustable autonomous systems using adaptive control" by Matsutani et al. (*IEEE Conference on Decision and Control*, pp. 6760-6764, 2011). An interpretation of this stability limit is given in the next corollary.

Corollary 1. There exists $\alpha \in \mathbb{R}_+$ such that eqn. (22) holds if $$\|SG_1\|_2 \|H\|_2 \lambda_U w^* l + \|SG_2\|_2 \|H\|_2 < \frac{1}{4 \|PB\|_2}. \quad (28)$$

Proof. Let $m_1$ and $m_2$ be the leading principle minors of the matrix $\mathcal{R}$ given by $$m_1 = 1, \quad (29)$$

$$m_2 = \alpha - (\beta^{-1} \|PB\|_2 \|H\|_2 + \alpha\beta \|SG_1\|_2 \lambda_U w^* l + \alpha\beta \|SG_2\|_2)^2. \quad (30)$$

Note that $m_1 \in \mathbb{R}_+$ holds automatically. In addition, there always exists a positive $\alpha$ such that $m_2 \in \mathbb{R}_+$ holds when eqn. (28) is true. Hence, since in this case all the leading principle minors of $\mathcal{R}$ are positive, it follows that eqn. (22) holds.

Remark 2. It follows from the results in Theorem 1 and Corollary 1 that the solution $(e(t), z(t), \tilde{W}(t))$ of the closed-loop dynamical system is uniformly bounded for all initial conditions when the stability limit given by eqn. (28) holds. In particular, it can be readily seen from eqn. (28) that the closed-loop dynamical system remains bounded either if there does not exist significant unmodeled dynamics or the effect of system uncertainties is negligible. Hence, the standard model reference adaptive control formulation considered in this section cannot tolerate large system uncertainties even when unmodeled dynamics satisfy a set of conditions, which violates the main purpose of utilizing an adaptive controller in the feedback loop, as discussed.

An adaptive control architecture is proposed to relax the stability limit revealed above and discussed in Remark 2. For this purpose, an adaptive robustifying term is introduced to the standard adaptive control formulation. Specifically, let the adaptive control law can be given by $$u(t) = -\hat{W}^T(t)\sigma(\cdot) - \hat{\mu}(t)B^T Pe(t), \quad (31)$$

where $\hat{W}(t)$ satisfies the weight update law given by eqn. (19) and $\hat{\mu}(t)$ is a projection operator-based adaptive robustifying term given by $$\dot{\hat{\mu}}(t) = \mu_0 \text{Proj}(\hat{\mu}(t), \|B^T Pe(t)\|_2^2 - \sigma_\mu \hat{\mu}(t)), \hat{\mu}(0) = \hat{\mu}_0, \hat{\mu}(0) \in \overline{\mathbb{R}}_+, \quad (32)$$

with $\mu_0 \in \mathbb{R}_+$ and $\sigma_\mu \in \mathbb{R}_+$ being design parameters. Note that since $\hat{\mu}(0) \in \overline{\mathbb{R}}_+$, $\hat{\mu}(t) \in \overline{\mathbb{R}}_+$ holds automatically. In addition, select the projection bound for eqn. (32) as $$\hat{\mu}(t) \leq \mu \Psi, \mu \triangleq \lambda_{ij}^{-2} l^2 w^{*2} + \lambda_L, \Psi > 1, \quad (33)$$

where $\psi > 1$ allows one to choose a sufficient large projection bound as necessary. It should be noted that the results of this section also hold without the leakage term (i.e., $-\sigma_\mu \hat{\mu}(t)$) in eqn. (32); however, this term can be utilized to drive $\hat{\mu}(t)$ closer to zero for instants when the effect of $\|B_T Pe(t)\|_2^2$ in (32) becomes small.

Next, using eqn. (31) respectively in eqns. (17) and (12), one can write $$\dot{e}(t) = A_r e(t) - B\Lambda \tilde{W}^T(t)\sigma(\cdot) - \hat{\mu}(t)B\Lambda B^T Pe(t) + \beta^{-1} BHz(t), \quad e(0) = e_0, \quad (34)$$

$$\dot{z}(t) = Fz(t) - \beta G_1 \Lambda \tilde{W}^T(t)\sigma(\cdot) - \beta \hat{\mu}(t) G_1 \Lambda B^T Pe(t) + \Lambda G_2 x(t), z(0) = z_0, \quad (35)$$

Next, boundedness of the closed-loop dynamical system is shown with the proposed adaptive robustifying term and that the proposed approach relaxes the stability limit given by eqn. (28).

Theorem 2. Consider the uncertain dynamical system subject to control signal and system state dependent unmodeled dynamics given by eqns. (11) and (12), the reference system given by eqn. (15), the adaptive control law given by eqns. (31), (19), and (32), and assume that Assumptions 1 and 2, and the following condition $$\mathcal{R} \triangleq \begin{bmatrix} 1 & 0 & \eta_1 \\ 0 & 2\mu_L & \eta_2 \\ \eta_1 & \eta_2 & \alpha \end{bmatrix} > 0, \quad (36)$$

hold, where $\alpha \in \mathbb{R}_+$, $\eta_1 \triangleq -\alpha\beta\lambda_U w^*l\|SG_1\|_2 - \alpha\beta\|SG_2\|_2$, and $\eta_2 \triangleq -\beta^{-1}\|H\|_2 - \alpha\beta\mu\psi\lambda_U\|SG_1\|_2$. Then, the solution (e(t), $\tilde{W}$(t), z(t), $\mu$(t)), $\tilde{\mu}(t) \triangleq \hat{\mu}(t) - \mu$, of the closed-loop dynamical system is uniformly bounded for all initial conditions.

Proof. To show uniform boundedness of the solution (e(t), $\tilde{W}$(t), z(t), $\tilde{\mu}$(t)) for all initial conditions, consider the Lyapunov-like function given by $$\mathcal{V}(e, \tilde{W}, z, \tilde{\mu}) = e^T Pe + \gamma^{-1} tr\left(\tilde{W}\Lambda^{\frac{1}{2}}\right)^T \left(\tilde{W}\Lambda^{\frac{1}{2}}\right) + \alpha z^T Sz + \mu_0^{-1} \tilde{\mu}^2 \lambda_L. \quad (37)$$

Note that $\mathcal{V}(0,0,0,0)=0$ and $\mathcal{V}(e, \tilde{W}, z, \tilde{\mu})>0$ for all $(e, \tilde{W}, z, \tilde{\mu}) \neq (0,0,0,0)$. Differentiating eqn. (37) along the closed-loop dynamical system trajectories yields $$\dot{\mathcal{V}}(e(t), \tilde{W}(t), z(t), \tilde{\mu}(t)) = -e^T(t)e(t) - 2e^T(t)PB\Lambda \tilde{W}^T(t)\sigma(\cdot) - 2\hat{\mu}(t)e^T(t)e^T(t)PB\Lambda B^T Pe(t)$$

$$+ 2\beta^{-1}e^T(t)PBHz(t) - \alpha z^T(t)z(t) - 2\alpha\beta z^T(t)SG_1\Lambda \tilde{W}^T(t)\sigma(\cdot)$$

$$- 2\alpha\beta\hat{\mu}(t)z^T(t)SG_1\Lambda B^T Pe(t) + 2\alpha\beta z^T(t)SG_2 x(t)$$

$$+ 2\gamma^{-1}tr\tilde{W}^T(t)\dot{\hat{W}}(t)\Lambda + 2\mu_0^{-1}\tilde{\mu}(t)\dot{\hat{\mu}}(t)\lambda_L.$$

Now, an upper bound for eqn. (38) can be calculated as $$\dot{\mathcal{V}}(e(t), \tilde{W}(t), z(t), \tilde{u}(t)) \leq -\|e(t)\|_2^2 - \alpha\|z(t)\|_2^2 - 2\mu_L\|B^T Pe(t)\|_2^2 - \quad (39)$$

$$2e^T(t)PB\Lambda \tilde{W}^T(t)\sigma(\cdot) + 2tr\tilde{W}^T(t)\text{Proj}_m[\hat{W}(t), \sigma(\cdot)e^T(t)PB] +$$

$$2\beta^{-1}\|B^T Pe(t)\|_2\|H\|_2\|z(t)\|_2 +$$

$$2\alpha\beta\|\Lambda\|_2\|\hat{W}(t)\|_2\|SG_1\|_2\|z(t)\|_2\|\sigma(\cdot)\|_2 +$$

$$2\alpha\beta\hat{\mu}(t)\|SG_1\|_2\|\Lambda\|_2\|z(t)\|_2\|B^T Pe(t)\|_2 +$$

$$2\alpha\beta\|z(t)\|_2\|SG_2\|_2\|x(t)\|_2 - 2\tilde{\mu}(t)\lambda_L\|B^T Pe(t)\|_2^2 +$$

$$2\tilde{\mu}(t)\text{Proj}(\hat{\mu}(t), \|B^T Pe(t)\|_2^2 - \sigma_\mu \hat{\mu}(t))\lambda_L +$$

$$2\sigma_\mu \lambda_L \tilde{\mu}(t)\hat{\mu}(t) - 2\sigma_\mu \lambda_L \tilde{\mu}(t)\hat{\mu}(t) \leq -\|e(t)\|_2^2 - \alpha\|z(t)\|_2^2 -$$

$$2\mu_L\|B^T Pe(t)\|_2^2 + 2\beta^{-1}\|B^T Pe(t)\|_2\|H\|_2\|z(t)\|_2 +$$

$$2\alpha\beta\|\Lambda\|_2\|\hat{W}(t)\|_2\|SG_1\|_2\|z(t)\|_2\|\sigma(\cdot)\|_2 +$$

$$2\alpha\beta\hat{\mu}(t)\|SG_1\|_2\|\Lambda\|_2\|z(t)\|_2\|B^T Pe(t)\|_2 +$$

$$2\alpha\beta\|z(t)\|_2\|SG_2\|_2\|x(t)\|_2 + 2\sigma_\mu \lambda_L \hat{\mu}(t)\mu - 2\sigma_\mu \lambda_L \hat{\mu}^2(t).$$

Similar to the proof of Theorem 1, eqn. (39) can be rewritten as $$\dot{\mathcal{V}}(e(t), \tilde{W}(t), z(t), \tilde{u}(t)) \leq -\|e(t)\|_2^2 - \alpha\|z(t)\|_2^2 - \quad (40)$$

$$2\mu_L\|B^T Pe(t)\|_2^2 + 2\beta^{-1}\|B^T Pe(t)\|_2\|H\|_2\|z(t)\|_2 +$$

$$2\alpha\beta\lambda_U w^*\|SG_1\|_2\|z(t)\|_2[l\|e(t)\|_2 + d^*] +$$

$$2\alpha\beta\mu\psi\|SG_1\|_2\lambda_U\|z(t)\|_2\|B^T Pe(t)\|_2 +$$

$$2\alpha\beta\|z(t)\|_2\|SG_2\|_2[\|e(t)\|_2 + \|x_r(t)\|_2] - 2\sigma_\mu \lambda_L \hat{\mu}^2(t) + 2\sigma_\mu \lambda_L \mu^2 \psi \leq$$

$$-\xi^T(t)\mathcal{R}\xi(t) + r_0\|z(t)\|_2 + c^*,$$

where $\xi(t) \triangleq [\|e(t)\|_2, \|B^T Pe(t)\|_2, \|z(t)\|_2]^T$, $r_0 \triangleq 2\alpha\beta\|SG_1\|_2\lambda_U w^*d^* + 2\alpha\beta\|SG_2\|_2 x^*_r$, and $c^* \triangleq 2\Lambda_L \sigma_\mu \mu^2 \Psi$. Finally, eqn. (40) can be further written as $$\dot{\mathcal{V}}(e(t), \tilde{W}(t), z(t), \tilde{u}(t)) \leq -\left[\sqrt{\lambda(R)}\|\xi(t)\|_2 - \frac{r_0}{2\sqrt{\lambda(R)}}\right]^2 + \left(\frac{r_0^2}{4\lambda(R)} + c^*\right), \quad (41)$$

and hence, there exists a compact set such that $\dot{\mathcal{V}}(e(t), \tilde{W}(t), z(t), \tilde{\mu}(t)) < 0$ outside of this set, which proves uniform boundedness of solution (e(t), $\tilde{W}$(t), z(t), $\tilde{\mu}$(t)) for all initial conditions.

In the proof of Theorem 2, eqn. (41) presents an upper bound of the time derivative of the Lyapunov function given by eqn. (37), which is used to conclude uniform boundedness of the solution $(e(t), \tilde{W}(t), z(t), \tilde{\mu}(t))$ for all initial conditions. In order to reach this conclusion, a sufficient condition is given by eqn. (36)—the positive-definiteness of $\mathcal{R}$. Similar to Corollary 1 and under the assumption of $$\lambda_L > \frac{1}{2},$$

a theoretical interpretation of eqn. (36) can be stated in the following corollary. In particular, this corollary shows conditions for the positive-definiteness of $\mathcal{R}$, where this reveals the aforementioned relaxed stability limit, i.e., when unmodeled system dynamics satisfy these conditions, then closed-loop dynamical system remains stable even in the presence of large system uncertainties unlike standard adaptive controllers previously discussed.

Corollary 2. If the conditions $$\|SG_1\|_2 \|H\|_2 < \frac{\sqrt{2\lambda_L} - 1}{\psi \lambda_U}, \qquad (42)$$

$$\|SG_2\|_2\|H\|_2 + \|SG_1\|_2\|H\|_2 \lambda_U w^* l < \frac{1}{\sqrt{2}} \qquad (43)$$

$$\sqrt{\frac{(\lambda_U^2 w^{*2} l^2 + \lambda_L)(2\lambda_L - 1 - \psi^2 \lambda_U^2 \|SG_1\|_2^2 \|H\|_2^2 - 2\psi\lambda_U \|SG_1\|_2 \|H\|_2)}{\lambda_L}},$$

hold, then eqn. (36) is satisfied.

Proof. Let $m_1$, $m_2$, and $m_3$ be the leading principle minors of the matrix $\mathcal{R}$ given by $$m_3 = 2\alpha\mu\lambda_L - \beta^{-2}\|H\|_2^2 - 2\alpha\lambda_U \mu\psi\|H\|_2 \|SG_1\|_2 - \qquad (46)$$
$$\alpha^2\beta^2 \lambda_U^2 \mu^2 \psi^2 \|SG_1\|_2^2 - 2\alpha^2\beta^2 \lambda_L \lambda_U^2 l^2 \mu w^{*2} \|SG_1\|_2^2 -$$
$$2\mu\lambda_L \alpha^2 \beta^2 \|SG_2\|_2^2 - 4\mu\lambda_L \alpha^2 \beta^2 \lambda_U w^* l \|SG_1\|_2 \|SG_2\|_2.$$

Note that $m_1 \in \mathbb{R}_+$ and $m_2 \in \mathbb{R}_+$ hold automatically. To show $m_3 \in \mathbb{R}_+$, let $$\beta \triangleq \frac{\|H\|_2}{\sqrt{\alpha\mu}}$$

such that $$m_3 = \alpha\mu\left[2\lambda_L - 1 - \lambda_U^2 \psi^2 \|H\|_2^2 \|SG_1\|_2^2 - \right. \qquad (47)$$
$$\left. 2\lambda_U \psi \|H\|_2 \|SG_1\|_2 - 2\lambda_L \left( \frac{\lambda_U^2 w^{*2} l^2 \|H\|_2^2 \|SG_1\|_2^2}{\mu} + \right.\right.$$
$$\left.\left. \frac{\|H\|_2^2 \|SG_2\|_2^2}{\mu} + \frac{2\lambda_U w^* l \|H\|_2^2 \|SG_1\|_2 \|SG_2\|_2}{\mu} \right)\right].$$

Now, using the definition of $\mu$ in eqn. (33), eqn. (47) can be equivalently written as $$m_3 = \alpha\mu[2\lambda_L - 1 - 2\lambda_U \psi\|SG_1\|_2\|H\|_2 - (\lambda_U^2 \psi^2 + 1)\|SG_1\|_2^2\|H\|_2^2] - \qquad (48)$$
$$\alpha\mu\left[2\lambda_L \left( \frac{\lambda_U^2 w^{*2} l^2 \|H\|_2^2 \|SG_1\|_2^2}{\lambda_U^2 w^{*2} l^2 + \lambda_L} + \right.\right.$$
$$\left.\left. \frac{\|H\|_2^2 \|SG_2\|_2^2}{\lambda_U^2 w^{*2} l^2 + \lambda_L} + \frac{2\lambda_U w^* l \|H\|_2^2 \|SG_1\|_2 \|SG_2\|_2}{\lambda_U^2 w^{*2} l^2 + \lambda_L} \right)\right],$$

and hence, $m_3 \in \mathbb{R}_+$ holds when eqns. (42) and (43) are true. Finally, since in this case all the leading principle minors of $\mathcal{R}$ are positive, it follows that eqn. (36) holds.

Remark 3. Since $$\lambda_L > \frac{1}{2}$$

and eqn. (42) are assumed for the results in Corollary 2, one can rewrite the upper bound for eqn. (43) as $$\|SG_1\|_2\|H\|_2 \lambda_U w^* l + \|SG_2\|_2\|H\|_2 < \frac{1}{\sqrt{2}} \sqrt{\left(\frac{\lambda_U^2 w^{*2} l^2}{\lambda_L}\right)\varphi + \varphi}, \qquad (49)$$

or equivalently $$\frac{\|SG_1\|_2\|H\|_2 \lambda_U w^* l + \|SG_2\|_2\|H\|_2}{\sqrt{\left(\frac{\lambda_U^2 w^{*2} l^2}{\lambda_L}\right)\varphi + \varphi}} < \frac{1}{\sqrt{2}}, \qquad (50)$$

where $\varphi \triangleq (2\lambda_L - 1 - \rho_2(2\lambda_L + 1 - 2\sqrt{2\lambda_L}) - 2\rho(\sqrt{2\lambda_L} - 1))$ and $\rho \in (0,1)$. Unlike the stability limit for the standard model reference adaptive control problem given by eqn. (28) the left hand side of eqn. (50) is bounded with respect to $w^*$; that is, $$\lim_{w^* \to \infty} [\|SG_1\|_2\|H\|_2 \lambda_U w^* l + \|SG_2\|_2\|H\|_2] = \infty, \qquad (51)$$

whose left hand side grows unbounded with respect to $w^*$; that is, $$\lim_{w^* \to \infty} \left[\frac{\|SG_1\|_2\|H\|_2 \lambda_U w^* l + \|SG_2\|_2\|H\|_2}{\sqrt{\left(\frac{\lambda_U^2 w^{*2} l^2}{\lambda_L}\right)\varphi + \varphi}}\right] = \frac{\|SG_1\|_2\|H\|_2}{\sqrt{\varphi/\lambda_L}}. \qquad (52)$$

Thus, the proposed adaptive control framework described here with the adaptive robustifying term allows the closed-loop dynamical system to remain bounded in the presence of large system uncertainties when the unmodeled dynamics satisfy the condition given by eqn. (49) or $$\frac{\|SG_1\|_2\|H\|_2}{\sqrt{\varphi/\lambda_L}} < \frac{1}{\sqrt{2}}, \qquad (53)$$

as a worst-case scenario for sufficiently large system uncertainties. Finally, if both $\lambda_L$ and $\lambda_U$ are sufficiently close to 1 and $\rho$ is sufficiently close to 0, then eqn. (53) further implies that $$\|SG_1\|_2 \|H\|_2 < \frac{1}{\sqrt{2}}. \tag{54}$$

Figure 1:
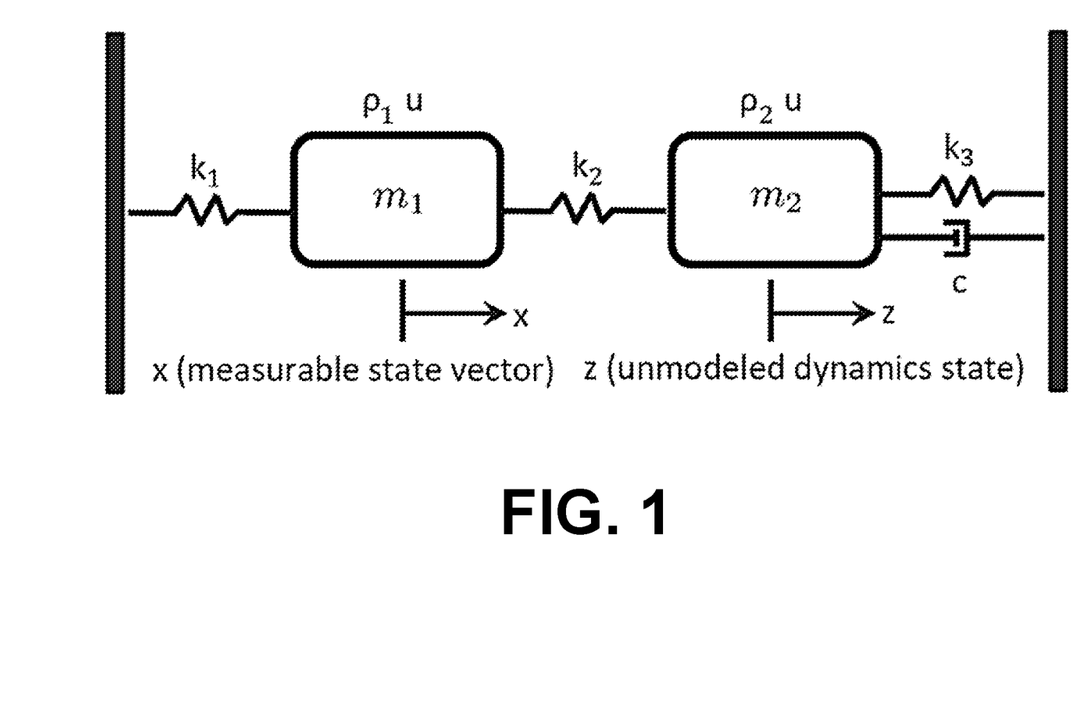
FIG. 1 is a graphical depiction illustrating an example of a coupled dynamical system, in accordance with various embodiments of the present disclosure.

The disclosed adaptive control framework with the adaptive robustifying term can be applied to a wide range of control applications with unmodeled dynamics. In particular, the proposed adaptive control framework can be applied to control of aviation systems or actuators (e.g., actuator dynamics of hypersonic vehicles) where the number of variables make system modeling difficult. FIG. 1 is a graphical depiction illustrating an example of a coupled dynamical system, with the dynamics given by $$\dot{x}(t) = \underbrace{\begin{bmatrix} 0 & 1 \\ 0 & 0 \end{bmatrix}}_{A} x(t) + \underbrace{\begin{bmatrix} 0 \\ \rho_1/m_1 \end{bmatrix}}_{B} Au(t) + \beta^{-1} \underbrace{\begin{bmatrix} 0 \\ \rho_1/m_1 \end{bmatrix}}_{B} \underbrace{\begin{bmatrix} k_2/\rho_1 \\ 0 \end{bmatrix}^T}_{H} z(t) + \tag{55}$$

$$\underbrace{\begin{bmatrix} 0 \\ \rho_1/m_1 \end{bmatrix}}_{B} \underbrace{\begin{bmatrix} (-k_1-k_2)/\rho_1 \\ 0 \end{bmatrix}^T}_{\delta(x(t))} x(t), x(0) = 0,$$

$$\dot{z}(t) = \underbrace{\begin{bmatrix} 0 & 1 \\ (-k_2-k_3)/m_2 & -c/m_2 \end{bmatrix}}_{F} z(t) + \beta \underbrace{\begin{bmatrix} 0 & 0 \\ k_2/m_2 & 0 \end{bmatrix}}_{G_2} x(t) + \tag{56}$$

$$\underbrace{\begin{bmatrix} 0 \\ \rho_2/m_2 \end{bmatrix}}_{G_1} Au(t), z(0) = 0,$$

where $k_1$, $k_2$, $k_3$, $m_1$, $m_2$, $\rho_1$, $\rho_2$, $\beta$ and $\Lambda$ are unknown parameters. Note that eqns. (55) and (56) can be equivalently represented in the form given by eqns. (11) and (12), where it is assumed that the second mass affects the first mass as an unmodeled system dynamic. For the study, set $k_1=4$, $k_2=3$, $k_3=4$, $m_1=1$, $m_2=0.2$, $\rho_1=1$, $\rho_2=0.8$, $\beta=0.05$ and $\lambda=1$. Consider a reference system subject to zero initial conditions with natural frequency of $w_n=0.3$ rad/s and a damping ratio $r_n=1$ such that $$A_r = \begin{bmatrix} 0 & 1 \\ -w_n^2 & -2w_n r_n \end{bmatrix}, B_r = \begin{bmatrix} 0 \\ w_n^2 \end{bmatrix}. \tag{57}$$

Figure 2A:
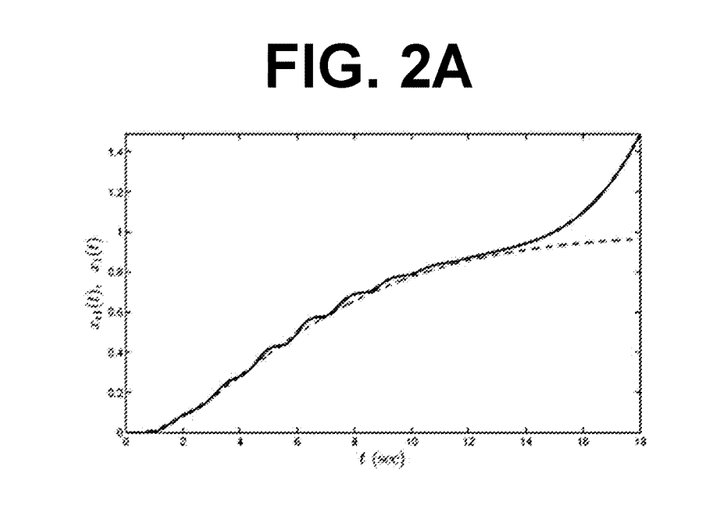
FIGS. 2A-2D illustrate unbounded operation of a model reference adaptive control approach, in accordance with various embodiments of the present disclosure.
Figure 2B:
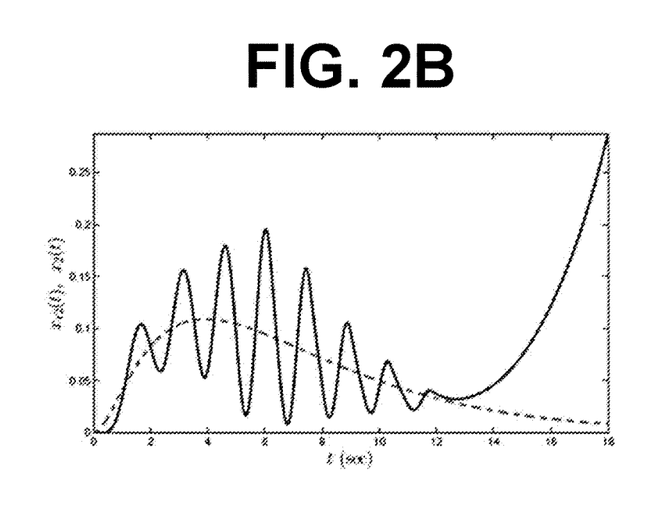
Figure 2C:
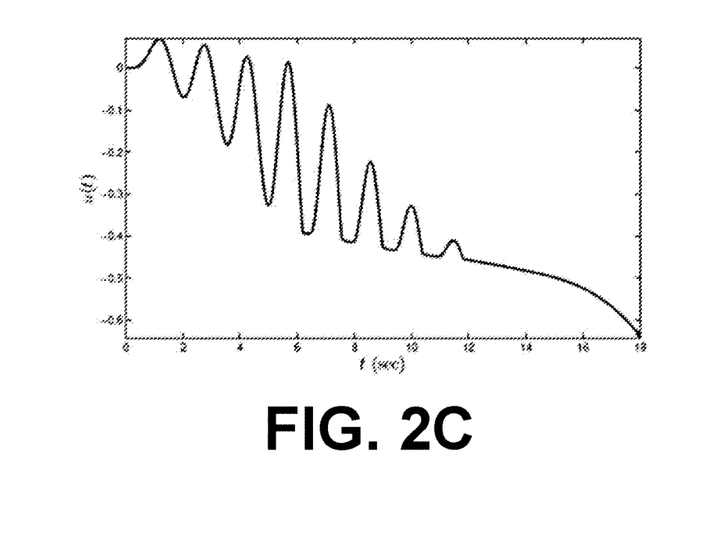
Figure 2D:
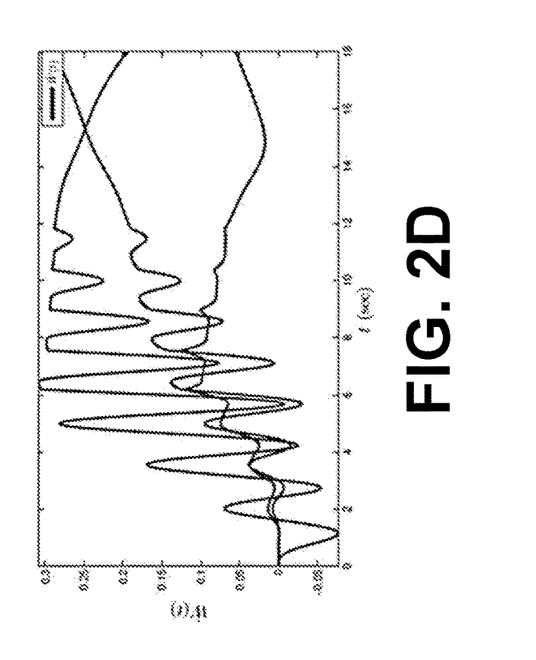

For the standard model reference adaptive control approach in Theorem 1 with $\gamma=0.4$ and the projection bound $W_{max}=0.35$, FIGS. 2A-2D show that the system state vector diverges from the reference state vector in time, and hence, the closed-loop dynamical system becomes unstable. FIG. 2A illustrates the uncertain dynamical system state, FIG. 2B illustrates the reference system state, FIG. 2C illustrates the control signal, and FIG. 2D illustrates the weight update law for the standard adaptive control design in Theorem 1. This result can be expected from Corollary 1. Because, the stated stability limit of this corollary does not hold in this case (to compute this limit, use $\lambda_L=0.95$, $\lambda_U=1.05$, $l=1$, and $w^*=0.866$), which results in $$\|SG_1\|_2 \|H\|_2 \Lambda_U w^* l + \|SG_2\|_2 \|H\|_2 = 0.4633, \tag{58}$$

and $$1/(4\|PB\|_2) = 0.0109, \tag{59}$$

For eqn. (28)). That is, it is clear from FIG. 2 that the standard model reference adaptive controller cannot tolerate the given unmodeled dynamics and the system uncertainty at the same time.

Figure 3A:
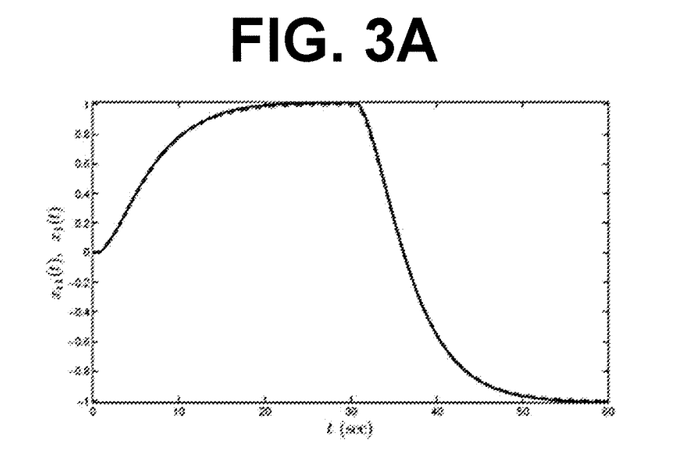
FIGS. 3A-3D illustrate unbounded operation of a model reference adaptive control approach utilizing an adaptive robustifying term, in accordance with various embodiments of the present disclosure.
Figure 3B:
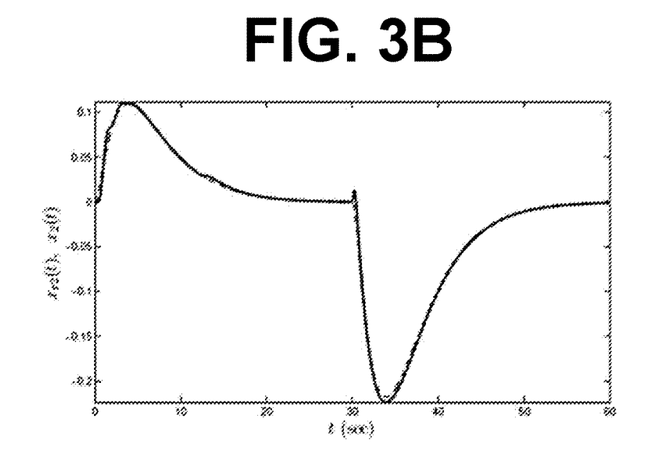
Figure 3C:
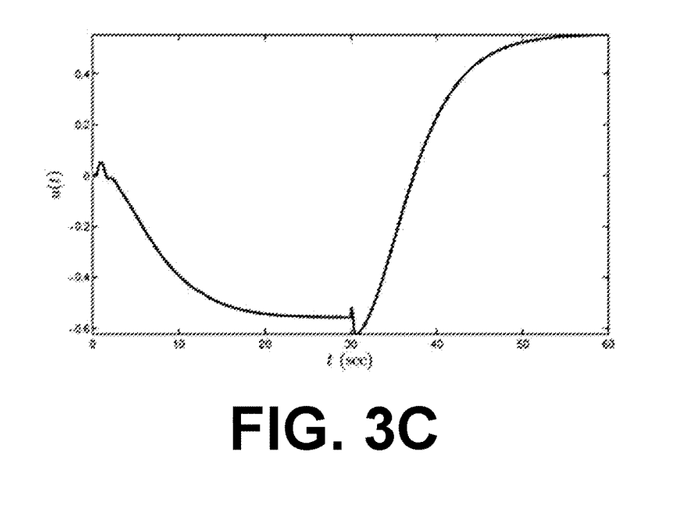
Figure 3D:
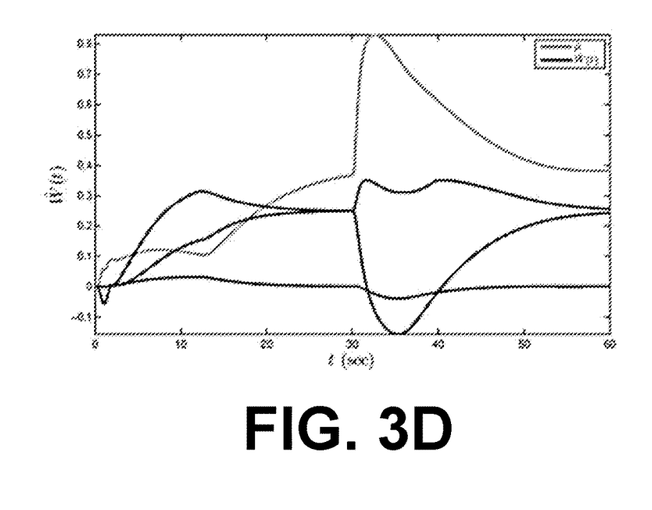

For the proposed model reference adaptive control approach in Theorem 2 with $\gamma=0.4$, $\mu_0=1.1$, $\sigma_\mu=0.05$, and the projection bounds $\hat{\mu}_{max}=1$ and $\hat{W}_{max}=0.35$, FIGS. 3A-3D show that the system state vector closely tracks the reference state vector in time, where the closed-loop dynamical system is clearly stable. FIG. 3A illustrates the uncertain dynamical system state, FIG. 3B illustrates the reference system state, FIG. 3C illustrates the control signal, and FIG. 3D illustrates the weight update law for the proposed adaptive control design in Theorem 2. This result is expected from Corollary 2. Because, the stated relaxed stability limit of this corollary holds in this case (to compute this limit, use $\lambda_L=0.95$, $\lambda_U=1.05$, and $\psi=1.1$), which results in $$\|SG_1\|_2 \|H\|_2 \Lambda_U w^* l + \|SG_2\|_2 \|H\|_2 = 0.4633, \tag{60}$$

and $$\frac{\frac{1}{\sqrt{2}}}{\sqrt{\frac{(\lambda_U^2 w^{*2} l^2 + \lambda_L)(2\lambda_L - 1 - \psi^2 \lambda_U^2 \|SG_1\|_2^2 \|H\|_2^2 - 2\psi \lambda_U \|SG_1\|_2 \|H\|_2)}{\lambda_L}}} = 0.7831, \tag{61}$$

for eqn. (43)). That is, this figure shows that the proposed model reference adaptive controller tolerates the given unmodeled dynamics and the system uncertainty at the same time.

Figure 4:
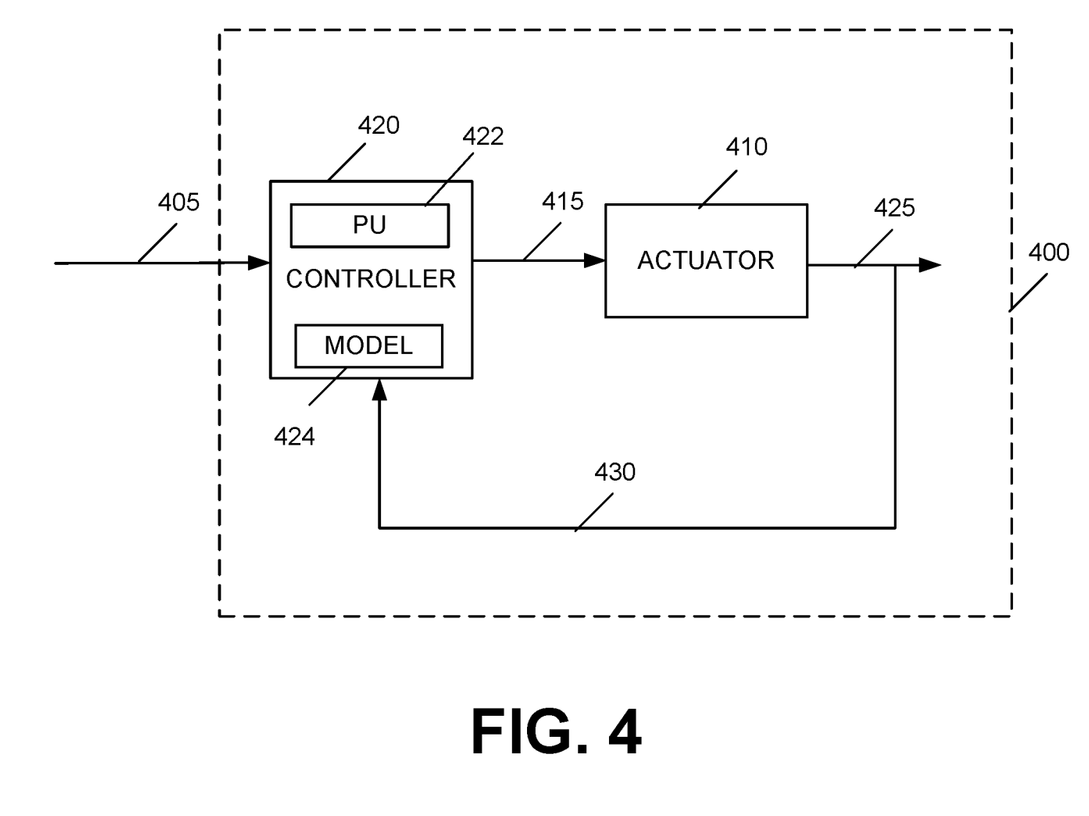
FIG. 4 is a schematic diagram illustrating an example of a control system, in accordance with various embodiments of the present disclosure.

Referring next to FIG. 4, shown is a schematic diagram illustrating an example of a control system that can be used in, e.g., an aircraft or other aviation system (e.g., an aircraft flight control system or actuator). In the example of FIG. 4, an actuator unit or system 410 may be positioned next to an element of a structure or between two or more elements of a structure that make up a physical system 400. The actuator unit 410 is configured to react to commands of a controller 420 in addition to stimuli from the surroundings such as the physical system 400 (e.g., a aircraft), in accordance with an exemplary embodiment of the present disclosure. The controller 420 is configured to receive one or more input, command, or sensor data 405 that can be used to control the actuator system 410 to produce a desired output 425 in accordance with the techniques and algorithms described in the present disclosure. For example, the controller 420 can be configured to produce one or more actuator command 415 based on the dynamics of the actuator unit or system 410 that requests the actuator 420 to produce the desired output. The controller 420 can also be configured to control multiple system components (e.g., actuator 410) to adjust overall system operation. To do so, the adaptive controller 410 can also receive feedback 430 from the output of the actuator unit 410. The feedback 430 can be provided by one or more sensors associated with the actuator 410 or the physical system 400. Accordingly, the actuator command can at least partially compensate for actuator dynamics in addition to other unmodeled system dynamic, such that the response of the actuator system 410 is improved thereby providing improved system control.

In accordance with the present disclosure, an embodiment of the controller 420 may include computing circuitry or processing unit (PU) 422 (with memory) configured to produce the control signals 415 for the actuator 410 using the dynamics of a system reference model 424 of the system 400 capturing a desired (i.e., ideal) closed-loop dynamical system performance of the actuator system 410 in response to a command input 415. The processing circuitry 422 can be configured to produce and adapt the actuator command or control signals by a process that does not model all system dynamics such that a product of the actual actuator system produces a desired response. As an example, the controller 420 of the system 400 may compute what output signal is needed to be applied to achieve a desired force, velocity, acceleration and/or displacement between the actuator unit and the structure (such as components of an aircraft or other aviation system, as an example, among others).

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The term "substantially" is meant to permit deviations from the descriptive term that don't negatively impact the intended purpose. Descriptive terms are implicitly understood to be modified by the word substantially, even if the term is not explicitly modified by the word substantially.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include traditional rounding according to significant figures of numerical values. In addition, the phrase "about 'x' to 'y'" includes "about 'x' to about 'y'".

Therefore, at least the following is claimed:
1. An aircraft or aviation system, comprising:
  a controller comprising processing circuitry including a processor and memory, the controller configured to:
    receive one or more input signals including control signals, sensor data associated with operation of the aircraft or aviation system, or a combination thereof;
    generate a system control signal utilizing a model reference adaptive control architecture comprising an adaptive robustifying term that maintains system stability within defined bounds, where the model reference adaptive control architecture accounts for unmodeled system dynamics z(t) of the aircraft or aviation system, or a combination thereof, given by:

$$\dot{x}(t) = Ax(t) + B\Lambda u(t) + B\delta(x(t)) + \beta^{-1}BHz(t),$$

-continued
$$x(0) = x_0,$$
$$\dot{z}(t) = Fz(t) + \beta G_1 \Lambda u(t) + BG_2 x(t),$$
$$z(0) = \beta_{z0},$$

where x(t) is a measurable state vector of the aircraft or aviation system, or the combination thereof, u(t) is a control input of the aircraft or aviation system, or the combination thereof, A is a known system matrix, B is a known input matrix, $\Lambda$ is an unknown control effectiveness matrix, $\delta$ is a system uncertainty, $\beta$ is a free variable, and F, $G_1$, $G_2$, and H are matrices associated with unmodeled dynamics such that F is Hurwitz; and
    provide the system control signal to an actuator to adjust operation of the aircraft or aviation system.

2. The aircraft or aviation system of claim 1, wherein the model reference adaptive control architecture is a closed-loop dynamical system.

3. The aircraft or aviation system of claim 2, wherein a physical system comprises an uncertain dynamical system.

4. The aircraft or aviation system of claim 1, wherein the adaptive robustifying term is a projection operator-based adaptive robustifying term $\hat{\mu}(t)$ given by $$\dot{\hat{\mu}}(t) = \mu_0 \text{Proj}(\hat{\mu}(t), \|B^T Pe(t)\|_2^2 - \sigma_\mu \hat{\mu}(t)), \hat{\mu}(0) = \hat{\mu}_0, \hat{\mu}(0) \in \overline{R}_+,$$

where $\mu_0$ and $\sigma_\mu$ are design parameters and a projection bound is $$u = \lambda_u^2, l^2 w^{*2} + \lambda_L$$

satisfying $$\hat{\mu}(t) \le \mu \psi, \psi > 1$$

5. The aircraft or aviation system of claim 1, wherein the model reference adaptive control architecture comprising the adaptive robustifying term maintains system operation within a relaxed stability limit having a defined lower limit $\lambda_L$ and upper limit $\lambda_U$.

6. The aircraft or aviation system of claim 1, wherein the controller generates a plurality of system control signals utilizing the model reference adaptive control architecture, the plurality of system control signals provided to a plurality of actuators or system components to adjust operation of the aircraft or aviation system.

7. A method for controlling an aircraft or aviation system, comprising:
    receive one or more input signals including data associated with operation of the aircraft or aviation system;
    generate a system control signal based upon at least a portion of the one or more input signals, the system control signal generated by a controller utilizing a model reference adaptive control architecture comprising an adaptive robustifying term that maintains system stability within defined bounds, where the model reference adaptive control architecture accounts for unmodeled system dynamics z(t) of the aircraft or aviation system, or a combination thereof, given by:

$$\dot{x}(t) = Ax(t) + B\Lambda u(t) + B\delta(x(t)) + \beta^{-1}BHz(t),$$

$$x(0) = x_0,$$

$$\dot{z}(t) = Fz(t) + \beta G_1 \Lambda u(t) + BG_2 x(t),$$

$$z(0) = \beta_{z0},$$

where x(t) is a measurable state vector of the aircraft or aviation system, or the combination thereof, u(t) is a control input of the aircraft or aviation system, or the combination thereof, A is a known system matrix, B is a known input matrix, $\Lambda$ is an unknown control effectiveness matrix, $\delta$ is a system uncertainty, $\beta$ is a free variable, and F, $G_1$, $G_2$, and H are matrices associated with unmodeled dynamics such that F is Hurwitz; and outputting the system control signal to an actuator or other system component thereby adjusting operation of the aircraft or aviation system.

8. The method of claim 7, wherein the one or more input signals comprise a control signal associated with operation of the aircraft or aviation system.

9. The method of claim 7, wherein the model reference adaptive control architecture is a closed-loop dynamical system.

10. The method of claim 9, wherein a physical system comprises an uncertain dynamical system.

11. The method of claim 7, wherein the adaptive robustifying term is a projection operator-based adaptive robustifying term $\hat{\mu}(t)$ given by $$\dot{\hat{\mu}}(t) = \mu_0 \text{Proj}(\hat{\mu}(t), \|B^T P e(t)\|_2^2 - \sigma_\mu \hat{\mu}(t)), \hat{\mu}(0) = \hat{\mu}_0, \hat{\mu}(0)\epsilon\overline{R}_+,$$

where $\mu_0$ and $\sigma_\mu$ are design parameters and a projection bound is $$u = \lambda_u^2, l^2 w^{*2} + \lambda_L$$

satisfying $$\hat{\mu}(t) \leq \mu\psi, \psi > 1.$$

12. The method of claim 7, wherein the model reference adaptive control architecture comprising the adaptive robustifying term maintains system operation within a relaxed stability limit having a defined lower limit $\lambda_L$ and upper limit $\lambda_U$.

13. The method of claim 7, comprising generating a second system control signal utilizing the model reference adaptive control architecture, and outputting the second system control signal to a second actuator of the aircraft or aviation system.

* * * * *